United States Patent [19]

Hart

[11] Patent Number: 4,705,293

[45] Date of Patent: Nov. 10, 1987

[54] GOLF TROLLEYS

[76] Inventor: Ian J. Hart, Four Gables, Hillcliffe Lane, Turnditch, Derbyshire, United Kingdom

[21] Appl. No.: 801,542

[22] Filed: Nov. 25, 1985

[30] Foreign Application Priority Data

Nov. 27, 1984 [GB] United Kingdom ............... 8429890

[51] Int. Cl.[4] .............................................. B62B 3/02
[52] U.S. Cl. ............................. 280/641; 280/47.37 R; 280/DIG. 5
[58] Field of Search ............... 280/641, 642, 646, 651, 280/DIG. 5, DIG. 6, 47.34, 47.37 R

[56] References Cited

U.S. PATENT DOCUMENTS

| D. 179,126 | 11/1956 | Eging | 280/DIG. 6 X |
|---|---|---|---|
| 2,335,579 | 11/1943 | Chamberlin et al. | 280/DIG. 6 X |
| 2,771,145 | 11/1956 | Peters | 280/DIG. 6 X |
| 3,123,173 | 3/1964 | Jacobs | 280/DIG. 5 X |
| 3,635,301 | 1/1972 | Tuson | 180/65.4 X |
| 4,289,324 | 9/1981 | Nemeth | 280/DIG. 5 X |
| 4,570,739 | 2/1986 | Kramer | 280/DIG. 5 X |

Primary Examiner—John J. Love
Assistant Examiner—Michael Mar
Attorney, Agent, or Firm—W. Thad Adams, III

[57] ABSTRACT

A collapsible golf trolley, especially an electrically powered trolley, has a sub-frame carrying an axle on which the main trolley wheels are mountable, a pivotally mounted extension carrying a forward wheel, and a two part handle pivotally mounted to the sub-frame whereby in the storage condition the extension is folded under the sub-frame and the handle, with one part folded back on the other is folded over the sub-frame.

13 Claims, 3 Drawing Figures

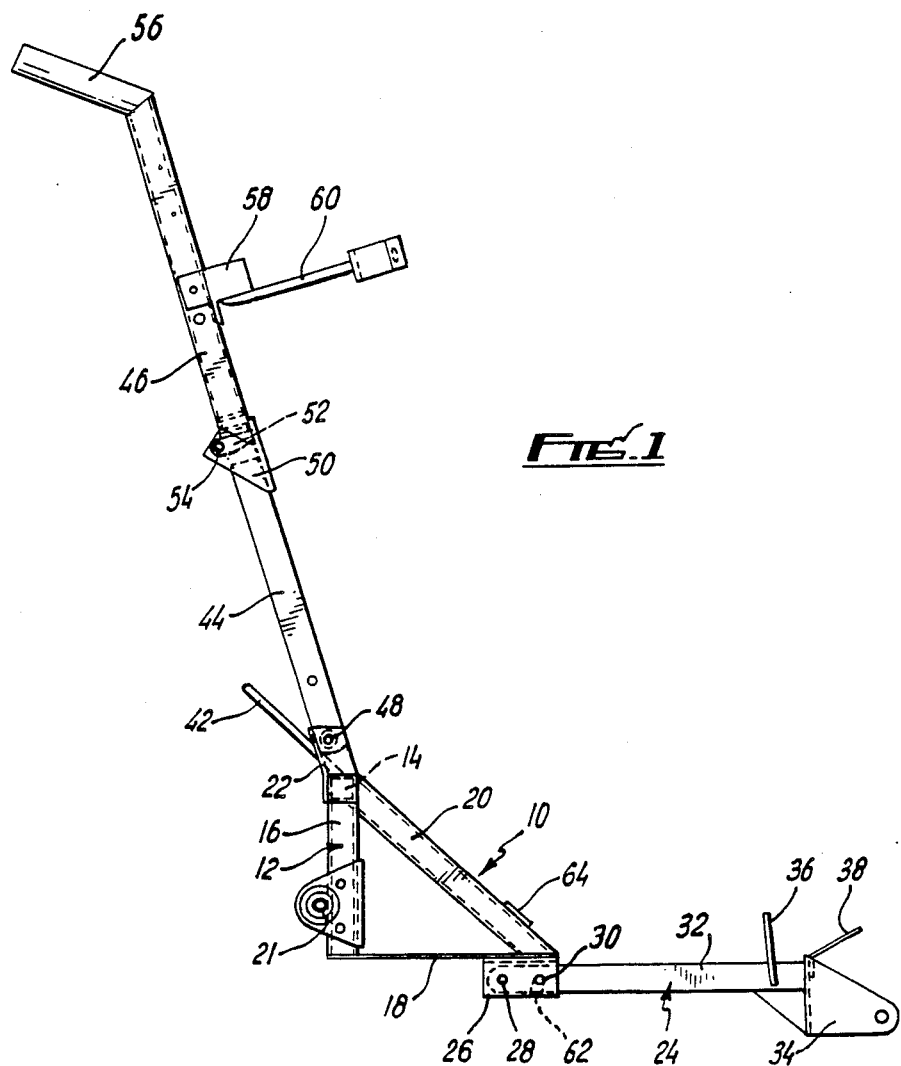

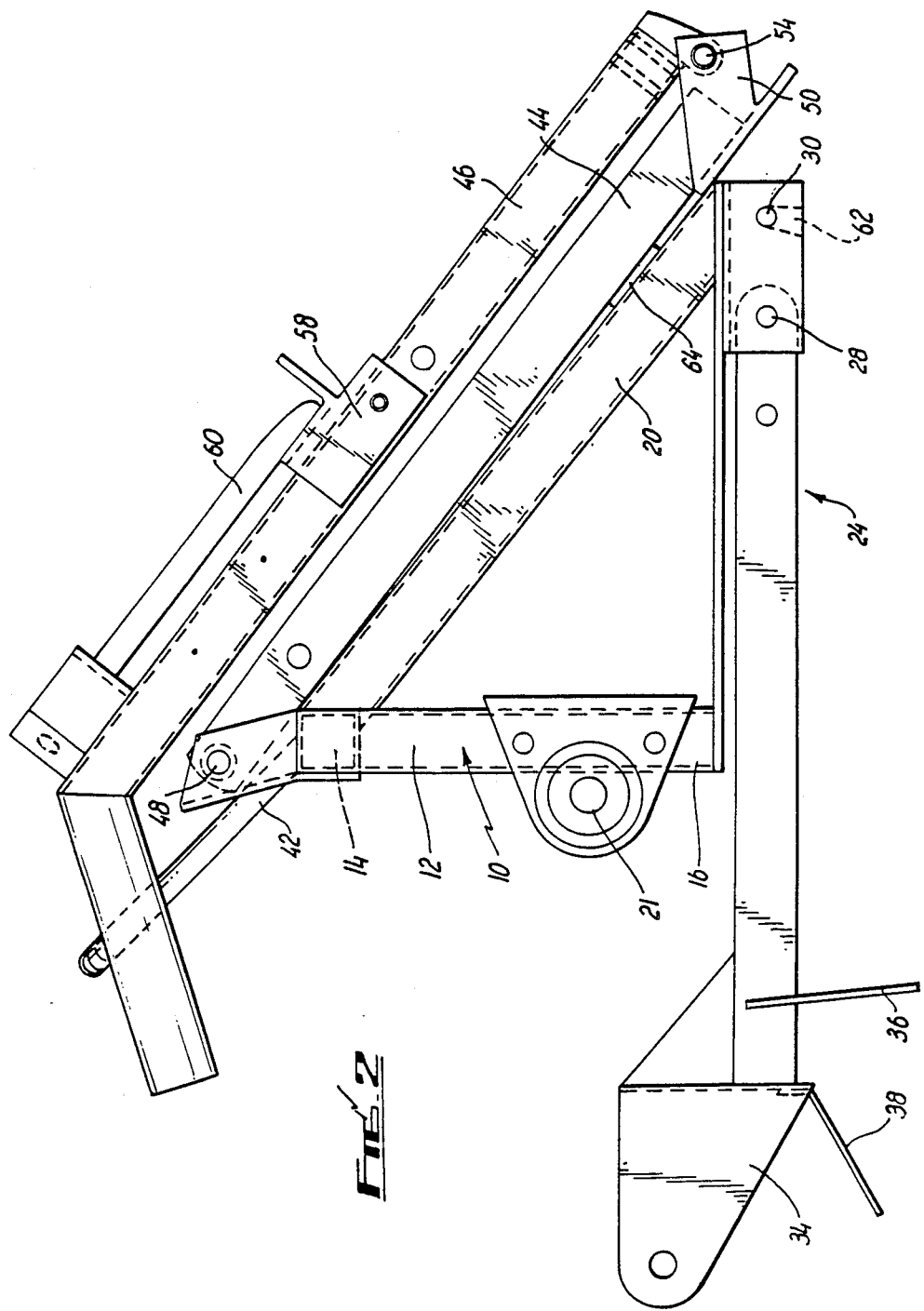

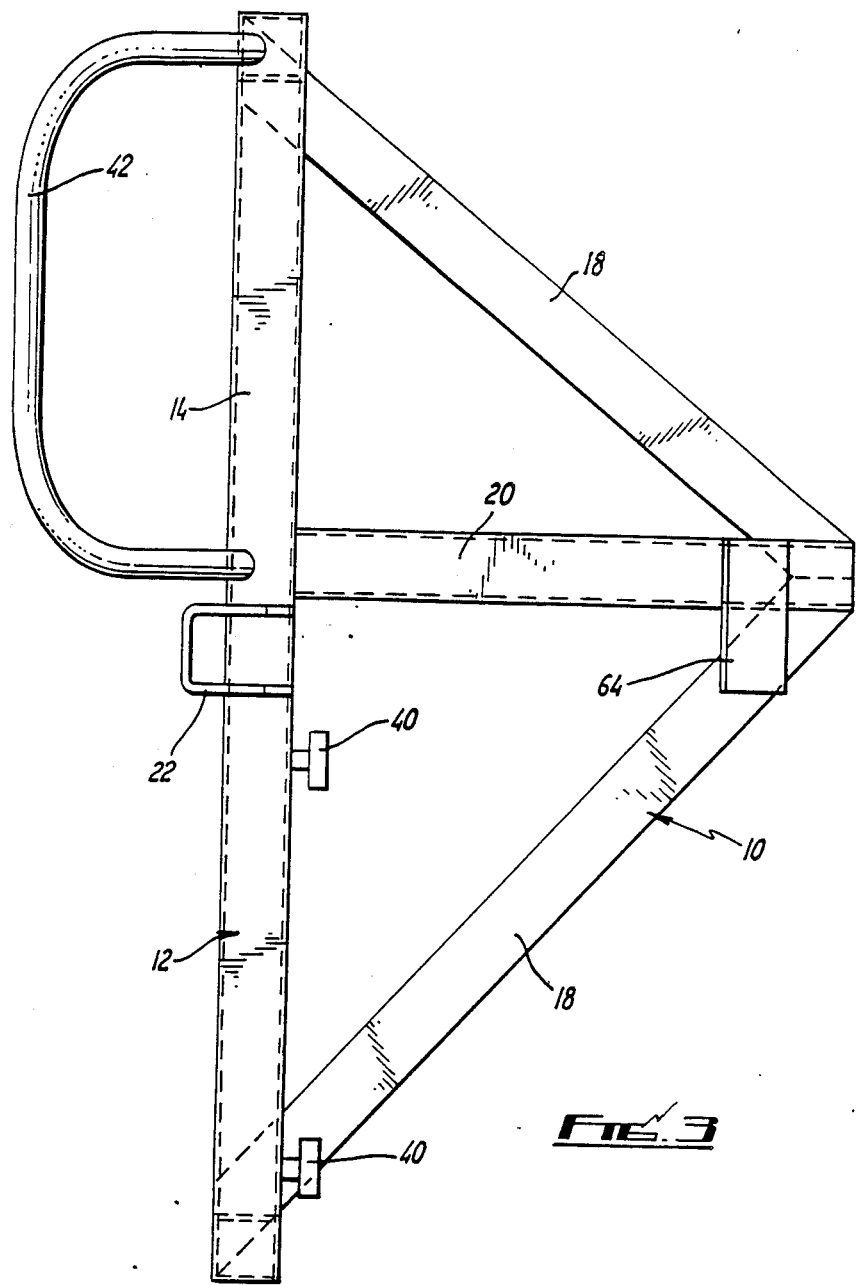

GOLF TROLLEYS

According to the present invention there is provided a golf trolley comprising a sub-frame mountable on a pair of wheels, an extension from said sub-frame for carrying at least one further wheel and pivotally mounted to the sub-frame and a handle extending, in use, upwardly from the sub-frame, the handle being hingedly mounted to the sub-frame and comprising two interconnected sections whereby for storage the handle may be folded over on itself and stored over the sub-frame while the extension is folded under the sub-frame.

Preferably locking means are provided to fix the extension to the sub-frame in its in-use position.

Preferably locking means are provided to lock together the two sections of the handle when in its in-use position.

Preferably an upper bag support is mounted on the handle. The upper bag support may be pivotally mounted to the handle such that it can extend substantially perpendicularly therefrom in the in-use condition and lie along the handle in the storage condition. Alternatively the bag support may be removably mounted on the handle. Preferably the extension from the sub-frame includes a lower bag support.

Preferably the sub-frame is substantially triangular in plan with the apex of the triangle pointing in the normal forward direction of the trolley.

Preferably a substantially rectangular rear frame extends upwardly from the base of the sub-frame and an inclined bracing member extends from the top member of said rear frame to the apex of the triangle.

Preferably bearings for the main wheels of the trolley are mounted on uprights of the rear frame and lugs for removably mounting a battery case are provided on the top member. Preferably an electric motor for the trolley is mounted on the forward side of the rear frame which carries also a gear box connected between the electric motor and an axle, on which the trolley wheels are mountable, extending between the said bearings.

Preferably a carrying handle is affixed to the top member on one side thereof such that the frame is balanced when the trolley is collapsed and with the battery removed.

Preferably a pivotal mounting means for the handle is fixed to the top member of the rear frame to one side of the bracing member. A stop to limit pivotal movement of the collapsed handle towards the sub-frame is provided on the strut.

Preferably the said locking means comprises a member having a threaded end threadably mounted in the member to be locked, an enlarged portion at the other end and an intermediate conical portion, said conical portion being accommodated in a slot formed in the member to which said other member is to be locked and being adapted to clamp against the slot when the pivotal member is in the in-use position and the member is screwed down.

An embodiment of the present invention will now be described by way of example only with reference to the accompanying drawings, in which:

FIG. 1 shows a golf trolley without its wheels in the in-use position;

FIG. 2 shows a trolley, still without its wheels, in the collapsed or storage position; and FIG. 3 shows a plan of the sub-frame of the trolley of FIGS. 1 and 2 with a handle and forward extension removed.

A golf trolley comprises a sub-frame 10 including a rectangular rear frame 12 of hollow box-section steel members having a top member 14 and two uprights 16. Two strip members 18 extend from the lower end of each upright 16 to provide a base of the sub-frame which is triangular in plan, with the apex of the triangle arranged in the forward direction of the trolley. A square hollow box-section bracing member 20 extends from the top member 14 of the rear frame to the intersection of said strip members 18. Bearings 21 for an axle (not shown) extending across the rear of the rear frame are fixed to the outer sides of the uprights 16 and a pivotal handle mounting member 22 which is U-shaped in plan with the opening in the U facing in the forward direction of the trolley is fixed to the top member 14. An electric motor and gearbox assembly mounting bracket (not shown) is also mounted to the top member. A forward extension 24 is pivotally mounted to the underside of the sub-frame 10, its mounting means comprising an extension mounting bracket 26 of U-shaped cross-section with the opening of the U facing downwards and a pivot pin 28 fixing the forward extension 24 in the bracket 26. Locking means, to be described below, engagable in a threaded hole 30 in the forward extension are provided for fixing the forward extension in the in-use position shown in FIG. 1.

The forward extension comprises a hollow box section member 32 having fixed to its forward end a single wide wheel mounting 34, golf bag-support bracket 36, and a bag end stop and mud guard 38.

As the drive means and transmission of the golf trolley do not form part of the present invention they will not be described in detail but it is sufficient to note that an electric motor is mounted to the front of the rear frame to one side of its centre line, said frame carrying also a gear box which transmits drive to the axle carried in the bearings 21, the axle in turn having the removable main wheels of the trolley, in use, fixedly mounted on its ends. A free wheel arrangement is incorporated in the transmission. On the side of the rear frame remote from the electric motor there is provided mounting means comprising two studs 40 on which a battery box can be suspended (see FIG. 3).

A carrying handle 42 is mounted on the top member 14 of the rear frame and it will be realised that as this handle is mounted on the opposite side of the rear frame as the electric motor and transmission means, when the battery is removed from the trolley and it occupies its transport position, the handle enables the collapsed trolley to be carried in a balanced manner.

The main handle for the trolley comprises two pivotally interconnected sections 44, 46, each manufactured from hollow box-section steel, the lower end of the lowermost section 44 being pivotally mounted by a pin 48 in the handle mounting bracket 22. The pivotal connection between the lower and upper sections 44, 46 of the handle comprises a bracket 50 which is U-shaped in plan with the opening in the U facing in the rearward direction of the trolley, the bracket being rigidly mounted to the upper end of the lower handle section 44. A rearwardly extending extension bracket 52 is fixed to the lower end of the upper section 46 of the handle and is pivotally mounted by means of a pin 54 in the bracket 50. A hand grip 56 is provided on the upper end of the upper section 46 which, intermediate its ends, carries a further bracket 58 to which an upper golf bag support 60 is pivotally mounted. Locking means, to be described below, are provided on the bracket 50 for locking the upper section 46 of the handle in the in-use position.

Control means for the electric motor, which do not form part of the present invention and are not illustrated, are mounted on the upper section of the handle between the bracket 58 and the grip 56.

The locking means for holding the upper and lower sections of the handle in the in-use condition and for holding the forward extension in position on the sub-frame include threaded holes in said upper handle section and said sub-frame (the threaded hole 30 in the forward extension being described above). A slot 62 shown only in the bracket 26 extends from the edge of the bracket so that its inner ends correspond with the threaded hole 30 when the extension is in the in-use position. The slot is arcuate having its centre coincident with the axis of the pivot pin 28. A locking pin which is not shown in the drawing but which comprises a threaded inner end portion and an enlarged diameter outer portion carrying a tommy bar has a conical section extending between the enlarged portion and the threaded portion. The diameter of the enlarged portion is greater than the width of the slot and the threaded portion is normally housed in the threaded hole 30 so that to lock the forward extension in position on the bracket 26 it is necesssary only to screw the holding member down into the hole 30 so that the conical section thereof engages the sides of the slot 62 to provide a positive mechanical lock.

FIG. 2 shows the trolley in the collapsed or transport position and it will be realised that in this position the forward extension is folded rearwardly under the base of the sub-frame while the handle is folded back on itself and pivoted downwardly alongside the strut 20. It will be realised at this stage that the handle mounting bracket 22 is not aligned with the strut 20 and that to prevent further downward pivoting movement of the collapsed handle relative to the sub-frame a stop 64 is attached to the upper face of the strut 20. If FIG. 2 is again considered and the trolley wheels are envisaged in position it will be seen that the rearwards projection of the folded over forward extension does not extend much beyond the wheel and the folded handle does not project much above the wheel so that in its collapsed condition the trolley is in or approaching the minimum dimensions.

Various modifications can be made without departing from the scope of the invention. For example, the sub-frame can include additional bracing means or can take an alternative form. The forward wheel carrying arrangement can be a sheet metal structure comprising a rectangular top mud guard member—similar to number 38, and two triangular side members extending downwardly therefrom and carrying the wheel axle. The upper bag support need not be hinged to the handle upper section 46 but could be removably fitted thereon.

Alternative locking means may be provided for holding the handle sections in the erected condition. The alternative means still includes a U-shaped bracket 50 fixed to the upper end of the lower section and carrying a pivot pin 54 about which the upper section pivots but locking is achieved by a bolt passing through a slot in the bracket and engaging in a nut fixed to the interior of the upper section in registry with a hole through the section which, in turn, in the erected condition coincides with the slot.

I claim:

1. A collapsible frame assembly for an electrically powered golf trolley having a pair of main wheels mounted on an axle, a forward wheel, an electric motor, a gear box, and a battery, said frame assembly comprising:
    (a) a subframe including a vertically extending, rectangular rear frame, a pair of strip members, each secured at one end to an opposite corner of the lower portion of said rear frame and secured together at their opposite ends to form a base portion having a triangular configuration with the apex of the triangle pointing towards the front of the trolley, an inclined bracing member extending from the apex of the base portion to a substantially central location along the top of said rear frame, and wheel bearings secured to said rear frame for supporting said wheel axle;
    (b) an extension member pivotally mounted at one end to the underside of the base portion at its apex for movement between a horizontal position extending forwardly of the subframe and a folded position extending horizontally below the subframe, said extension member having at its opposite end a wheel mounting for supporting said forward wheel; and
    (c) an elongated handle including a lower handle section pivotally mounted at a substantially central location along the top of said rear frame, an upper handle section pivotally secured to said lower handle section, and a hand grip secured to the top of said upper handle section;

wherein said trolley may be collapsed by pivoting said lower handle section forwardly to a location parallel with said inclined bracing member while also pivoting said upper handle section to a location parallel to and above said lower handle section and by pivoting said extension member to a location parallel to and below said base portion.

2. A collapsible frame assembly for an electrically powered golf trolley as claimed in claim 1 in which locking means are provided to fix the extension member to the sub-frame in its in-use position.

3. A collapsible frame assembly for an electrically powered golf trolley as claimed in claim 2, in which the said locking means comprises a member having a threaded end threadably mounted in the member to be locked, and a portion accommodated in a slot formed in the member to which said other member is to be locked and being adapted to clamp against the slot when the pivotal member is in the in-use position and the threaded member is screwed down.

4. A collapsible frame assembly for an electrically powered golf trolley as claimed in claim 1 in which locking means are provided to lock together the two sections of the handle when in its in-use position.

5. A collapsible frame assembly for an electrically powered golf trolley as claimed in claim 4, in which the said locking means comprises a threaded passage in one member to be locked, a passage through the outer member to be locked which, when the members are in the erected condition is aligned with the threaded member, and a locking nut.

6. A collapsible frame assembly for an electrically powered golf trolley as claimed in claim 1, in which an upper bag support is mounted on the handle.

7. A collapsible frame assembly for an electrically powered golf trolley as claimed in claim 6, in which the upper bag support is pivotally mounted to the handle such that it can extend substantially perpendicularly therefrom in the in-use condition and lie along the handle in the storage condition.

8. A collapsible frame assembly for an electrically powered golf trolley as claimed in claim 6, in which the bag support is removably mounted on the handle.

9. A collapsible frame assembly for an electrically powered golf trolley as claimed in claim 1, in which the extension member from the sub-frame includes a lower bag support.

10. A collapsible frame assembly for an electrically powered golf trolley as claimed in claim 1, in which bearings for the main wheels of the trolley are mounted on the rear frame.

11. A collapsible frame assembly for an electrically powered golf trolley as claimed in claim 1, in which lugs are removably mounting a battery case are provided on the top of the rear frame.

12. A collapsible frame assembly for an electrically powered golf trolley as claimed in claim 1, in which a carrying handle is affixed to the top of the rear frame on one side thereof such that the frame assembly is balanced when the trolley is collapsed and with the battery removed.

13. A collapsible frame assembly for an electrically powered golf trolley as claimed in claim 1, in which a pivotal mounting means for the handle is fixed to the top of the rear frame to one side of the bracing member.

* * * * *